(12) United States Patent
Nishihara et al.

(10) Patent No.: US 8,938,740 B2
(45) Date of Patent: Jan. 20, 2015

(54) RESOURCE ALLOCATION APPARATUS, RESOURCE ALLOCATION METHOD, AND COMPUTER READABLE MEDIUM

(75) Inventors: Kosuke Nishihara, Tokyo (JP); Kazuhisa Ishizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 329 days.

(21) Appl. No.: 13/581,775

(22) PCT Filed: Dec. 9, 2010

(86) PCT No.: PCT/JP2010/007163
§ 371 (c)(1), (2), (4) Date: Aug. 29, 2012

(87) PCT Pub. No.: WO2011/111141
PCT Pub. Date: Sep. 15, 2011

(65) Prior Publication Data
US 2012/0324469 A1     Dec. 20, 2012

(30) Foreign Application Priority Data
Mar. 11, 2010   (JP) .................................. 2010-054283

(51) Int. Cl.
*G06F 9/46*   (2006.01)
*G06F 9/50*   (2006.01)

(52) U.S. Cl.
CPC ........................................ *G06F 9/50* (2013.01)
USPC ............ 718/104; 718/102; 709/226; 709/229

(58) Field of Classification Search
None
See application file for complete search history.

(56) References Cited

U.S. PATENT DOCUMENTS

| 6,898,635 B2 * | 5/2005 | Jung .............................. 709/226 |
| 7,930,403 B2 * | 4/2011 | Saffre et al. ................... 709/226 |
| 8,112,756 B2 * | 2/2012 | Cherkasova et al. .......... 718/104 |

(Continued)

FOREIGN PATENT DOCUMENTS

| JP | 11-66018 A | 3/1999 |
| JP | 2000-155695 A | 6/2000 |

OTHER PUBLICATIONS

Nishihara et al. "Power Saving in Mobile Devices Using Context-Aware Resource Control" 2010, NEC Corporation, IEEE; (Nishihara_2010.pdf, pp. 1-7).*

(Continued)

*Primary Examiner* — Emerson Puente
*Assistant Examiner* — Hiren Patel
(74) *Attorney, Agent, or Firm* — Sughrue Mion, PLLC

(57) ABSTRACT

A parameter determination unit 110 substitutes, for each of a plurality of applications, a recommended amount of resources and a quality of experience corresponding to the recommended amount of resources, and a minimum amount of resources and a quality of experience corresponding to the minimum amount of resources into a quality function f in expression (1) indicating a relation between an amount of resources R and a quality of experience Q, to determine parameters a and b. A resource amount determination unit 120 determines an amount of resources to be allocated to the plurality of applications using the quality function f for each application in which the parameters a and b are determined. The quality function f(x) is a monotonically increasing function having an inverse function $f^{-1}$, connects $(-\infty, 0)$ and $(+\infty, 1)$, and is symmetrical with respect to x=0.

$$Q=f(x)=f((R-a)/b) \quad (1)$$

8 Claims, 14 Drawing Sheets

(56) References Cited

U.S. PATENT DOCUMENTS

| | | | | |
|---|---|---|---|---|
| 8,146,090 | B2* | 3/2012 | Travostino et al. | 718/104 |
| 8,326,992 | B2* | 12/2012 | Luzzatti et al. | 709/226 |
| 8,392,927 | B2* | 3/2013 | Rolia et al. | 718/104 |
| 8,464,255 | B2* | 6/2013 | Nathuji et al. | 718/1 |
| 8,584,128 | B1* | 11/2013 | Don et al. | 718/103 |
| 8,832,707 | B2* | 9/2014 | Henderson et al. | 718/104 |
| 2007/0039004 | A1* | 2/2007 | Guralnik et al. | 718/104 |
| 2009/0119673 | A1* | 5/2009 | Bubba | 718/104 |
| 2012/0054768 | A1* | 3/2012 | Kanna et al. | 718/104 |

OTHER PUBLICATIONS

Bashandy et al. "Generalized Quality of Service Routing With Resource Allocation", IEEE, Feb. 2, 2005; (Bashandy_2005.pdf, pp. 1-14).*

Kosuke Nishihara et al., "User Context Aware Resource Allocation for Application Performance Control", IEICE Technical Report, 2009, pp. 91-95, vol. 108, No. 487.

International Search Report for PCT/JP2010/007163 dated Jan. 18, 2011.

* cited by examiner

US 8,938,740 B2

RESOURCE ALLOCATION APPARATUS, RESOURCE ALLOCATION METHOD, AND COMPUTER READABLE MEDIUM

CROSS REFERENCE TO RELATED APPLICATIONS

This application is a National Stage of International Application No. PCT/JP2010/007163 filed Dec. 9, 2010, claiming priority based on Japanese Patent Application No. 2010-054283 filed Mar. 11, 2010, the contents of all of which are incorporated herein by reference in their entirety.

TECHNICAL FIELD

The present invention relates to a technique for allocating resources to a plurality of applications operated on a computer.

BACKGROUND ART

Various techniques have been suggested to allocate resources in a computer system.

For example, a QoS control apparatus disclosed in PTL 1 registers, in a table, an amount of resources to be assigned corresponding to the class of QoS that is determined in advance for a task that is being operated in an assignment amount registration means, and determines the resource allocation amount to each task based on the table.

Further, a distributed resource management system disclosed in PTL 2 creates, when resources to be shared by a plurality of applications are allocated, a demand function indicating the degree of demand of target resources required for the plurality of applications, to allocate the resources based on the demand function.

Small-sized devices such as mobile telephones, PNDs (Portable Navigation Devices), and DPFs (Digital Photo Frames) have limited resources of memory capacities and arithmetic capacities of CPUs. Thus, allocation of resources to applications is especially important. When a large number of applications are operated in these small-sized devices, these applications may not be able to operate as expected. This is because, since these applications contend for the limited resources, it is impossible to achieve the quality which can be accomplished in the case in which only one application is operated.

In order to smoothly operate a plurality of applications in a device with limited resources, it is required to appropriately allocate the resources to these applications. Since the appropriate allocation of resources is different depending on the number and the type of the applications that are operated, methods like equal allocation and best effort allocation are not preferable.

One known method is to calculate, for each of the plurality of applications that are being operated, the amount of resources to be allocated to each of the applications based on a relation between an amount of resources to be used by the application and a quality of user experience. The quality of user experience means the degree of satisfaction felt by users. The user satisfaction can be enhanced by performing resource allocation based on the quality of user experience.

CITATION LIST

Patent Literature

PTL 1: Japanese Unexamined Patent Application Publication No. 2000-155695

PTL 2: Japanese Unexamined Patent Application Publication No. 11-66018

SUMMARY OF INVENTION

Technical Problem

For example, one possible method is, with the application of the technique disclosed in PTL 1, for each application, a table indicating a relation between an amount of resources to be used by the application and the quality of experience is registered in advance, and allocation of resources is performed to these applications based on the table of each application that is operated.

Further, the table indicating the relation between the amount of resources to be used by the applications and the quality of experience may be created in advance by manufacturers of the applications and designers of the devices, for example.

However, recent mobile telephones include, however, even though they are small-sized devices, several tens of applications installed therein. In such a case, it requires a huge amount of energy to preliminary search the relation between the amount of resources to be used and the quality of experience for each application for the device on which a large number of applications are installed.

The present invention has been made based on the background stated above, and provides a technique to efficiently acquire the relation between the amount of resources to be used by each application and the quality of experience when the amount of resources is allocated to a plurality of applications operated on a device.

Solution to Problem

One exemplary aspect of the present invention is a resource allocation apparatus that performs allocation of an amount of resources to a plurality of applications operated on a computer. This resource allocation apparatus includes a parameter determination unit and a resource amount determination unit.

The parameter determination unit determines, for each of the plurality of applications, a first parameter a and a second parameter b in a quality function f of expression (1) indicating a relation between an amount of resources to be used and a quality of user experience. More specifically, for each of the applications, a recommended amount of resources and a quality of experience corresponding to the recommended amount of resources, and a minimum amount of resources and a quality of experience corresponding to the minimum amount of resources are substituted into expression (1), to calculate the first parameter a and the second parameter b in expression (1). Note that the quality function f(x) is a monotonically increasing function having an inverse function $f^{-1}$, connects $(-\infty, 0)$ and $(+\infty, 1)$, and is symmetrical with respect to x=0.

$$Q = f(x) = f((R-a)/b) \quad (1)$$

where
Q: quality of experience
f: quality function
R: amount of resources
a: first parameter
b: second parameter The resource amount determination unit determines an amount of resources to be allocated to the plurality of applications using the quality function f for each of the plurality of applications in which the first parameter a and the second parameter b are determined by the parameter determination unit.

Note that a method and a system with which the resource allocation apparatus according to the above aspect is replaced, a program for causing a computer to execute the operation of the resource allocation apparatus, a computer readable recording medium storing the program, and the like are also effective as aspects of the present invention.

Advantageous Effects of Invention

According to the technique of the present invention, it is possible to efficiently create a quality function which indicates a relation between an amount of resources to be used and a quality of user experience and is required to allocate resources to a plurality of applications.

DESCRIPTION OF EMBODIMENTS

Figure 1:
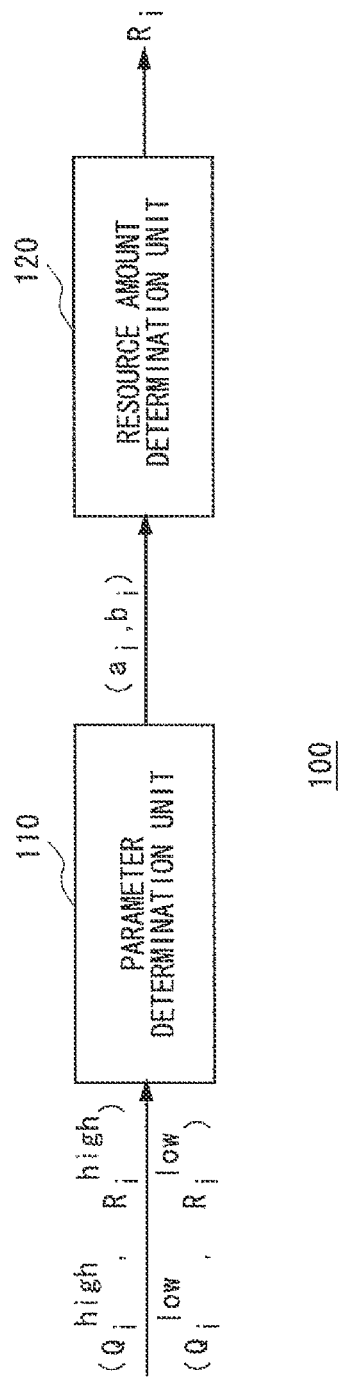
FIG. 1 is a diagram showing a resource allocation apparatus according to a first exemplary embodiment of the present invention.

Hereinafter, with reference to the drawings, exemplary embodiments of the present invention will be described. For the clarification of description, the following description and the drawings are omitted and simplified as appropriate. Further, each element shown in the drawings as functional blocks performing various processing may be formed of a CPU, a memory, and other circuits in hardware, and may be achieved by a program loaded to a memory in software. Accordingly, a person skilled in the art would understand that these functional blocks may be achieved in various ways, e.g., only by hardware, only by software, or the combination thereof without any limitation. Throughout the drawings, the identical components are denoted by the identical reference symbols, and overlapping description is omitted as appropriate.

Further, the program mentioned above can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

First Exemplary Embodiment

FIG. 1 shows a resource allocation apparatus 100 according to a first exemplary embodiment of the present invention. This resource allocation apparatus 100 is installed in a small-sized device such as a mobile telephone, and performs allocation of resources to applications operated on the small-sized device.

The resource allocation apparatus 100 includes a parameter determination unit 110 and a resource amount determination unit 120.

Figure 2:
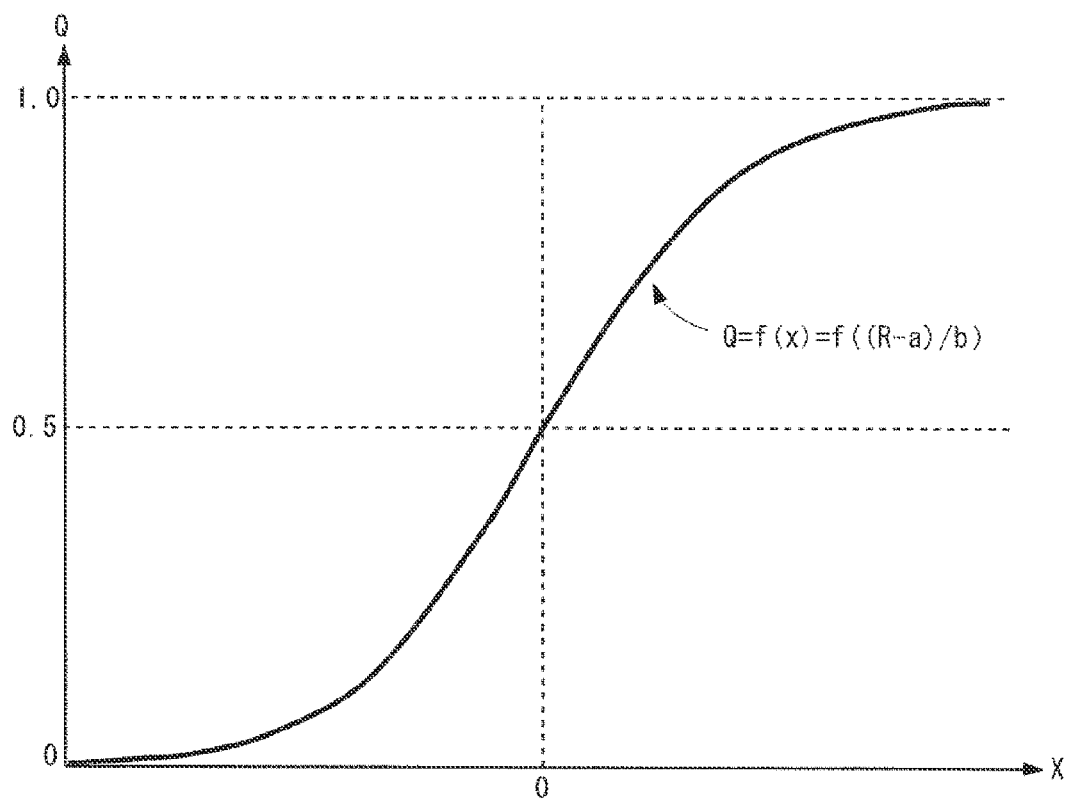
FIG. 2 is a diagram showing a quality function f.

The parameter determination unit 110 determines, for each of a plurality of applications activated by the small-sized device, a first parameter $a_i$ and a second parameter $b_i$ in a quality function f of expression (2) indicating a relation between an amount of resources to be used and a quality of user experience.

$$Q_i = f(x) = f((R_i - a_i)/b_i) \qquad (2)$$

where
i: number of application
$Q_i$: quality of experience
f: quality function
$R_i$: amount of resources
$a_i$: first parameter
$b_i$: second parameter As shown in FIG. 2, the quality function f(x) is a monotonically increasing function having an inverse function $f^{-1}$, connects $(-\infty, 0)$ and $(+\infty, 1)$, and is symmetrical with respect to x=0.

As the quality function f(x) which is a monotonically increasing function, such a function is employed in which values are gradually increased from $(-\infty, 0)$, the slope increases as x approaches 0, gradually decreases after x=0, and coordinates gradually approach $(+\infty, 1)$. The reason why the monotonically increasing function f(x) having such characteristics is used as the quality function is that it is possible to reproduce the characteristics of the quality of user experience that is assumed. This assumption is as follows. That is, if the performance is sufficiently accomplished, the user does not feel that the quality has improved even when the performance is somewhat further enhanced, whereas if the performance is hardly accomplished, the user does not feel that the quality has reduced even when the performance is further decreased. While the quality function f(x) is preferably continuous and smooth, it may be approximately continuous and smooth.

Figure 3:
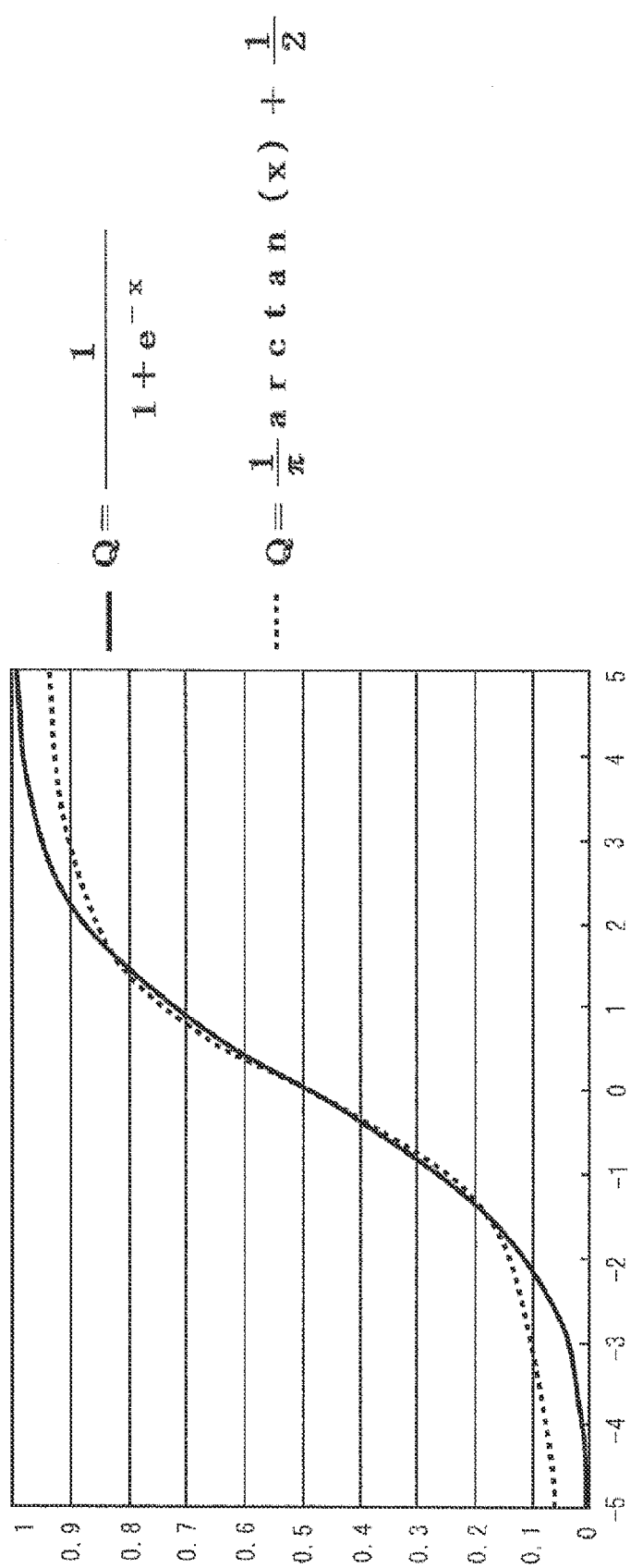
FIG. 3 is a diagram showing two specific examples of the quality function f.

FIG. 3 shows two specific examples of the quality function f(x). The solid line and the dotted line indicate f(x) in expression (3) and expression (4), respectively. The symbol "x" in expression (3) and expression (4) is "(R−a)/b".

$$f(x) = \frac{1}{1+e^{-x}} \quad (3)$$

$$f(x) = \frac{1}{\pi}\arctan(x) + \frac{1}{2} \quad (4)$$

While the one shown in expression (3) is used as an example of f(x) in the following description, the quality function is not limited to the function shown in expression (3).

Substituting, for each application, a recommended amount of resources $R_i^{high}$ and a quality of experience $Q_i^{high}$ corresponding to the recommended amount of resources $R_i^{high}$, and a minimum amount of resources $R_i^{low}$ and a quality of experience $Q_i^{low}$ corresponding to the minimum amount of resources $R_i^{low}$ of the application into expression (3) gives the following expression (5) and expression (6). Note that $R_i^{high}$, $Q_i^{high}$, $R_i^{low}$ and $Q_i^{low}$ are determined by manufacturers of the applications or designers of the devices, and are input to the parameter determination unit 110.

$$\begin{cases} Q_i^{high} = \dfrac{1}{1+e^{-\frac{R_i^{high}-a_i}{b_i}}} & (5) \\ Q_i^{low} = \dfrac{1}{1+e^{-\frac{R_i^{low}-a_i}{b_i}}} & (6) \end{cases}$$

Then, solving the simultaneous equations of expression (5) and expression (6) for $a_i$ and $b_i$ obtains the first parameter $a_i$ and the second parameter $b_i$ as shown in expressions (7) and (8).

$$\begin{cases} a_i = \dfrac{R_i^{low}\ln\left(\dfrac{1}{Q_i^{high}}-1\right) - R_i^{high}\ln\left(\dfrac{1}{Q_i^{low}}-1\right)}{\ln\left(\dfrac{1}{Q_i^{high}}-1\right) - \ln\left(\dfrac{1}{Q_i^{low}}-1\right)} & (7) \\ b_i = \dfrac{R_i^{low} - R_i^{high}}{\ln\left(\dfrac{1}{Q_i^{high}}-1\right) - \ln\left(\dfrac{1}{Q_i^{low}}-1\right)} & (8) \end{cases}$$

The parameter determination unit 110 calculates the first parameter $a_i$ and the second parameter $b_i$ for each application according to expressions (7) and (8) to supply the calculated results to the resource amount determination unit 120.

When $Q_i^{high}$ and $Q_i^{low}$ satisfy the following expression (9), the calculation of the first parameter $a_i$ and the second parameter $b_i$ becomes simple as shown in expression (10) and (11).

$$Q_i^{high} + Q_i^{low} = 1 \quad (9)$$

$$\begin{cases} a_i = \dfrac{R_i^{low} + R_i^{high}}{2} & (10) \\ b_i = \dfrac{R_i^{low} - R_i^{high}}{2\ln\left(\dfrac{1}{Q_i^{high}}-1\right)} & (11) \end{cases}$$

When $Q_i^{high}$ and $Q_i^{low}$ satisfy expression (9), the first parameter $a_i$ shown in expression (9) is an average value of the recommended amount of resources $R_i^{high}$ and the minimum amount of resources $R_i^{low}$. This is satisfied not only in the quality function f(x) shown in expression (3) but also in any monotonically increasing function that has an inverse function $f^{-1}$, connects (−∞, 0) and (+∞, 1), and is symmetrical with respect to x=0. This average value indicates an amount of resources when the quality Q is 0.5.

The resource amount determination unit 120 determines, using the first parameter a and the second parameter b of each application determined by the parameter determination unit 110, the amount of resources to be allocated to these applications.

In the first exemplary embodiment, the resource amount determination unit 120 determines the amount of resources to be allocated to each application so that the total amount of resources to be allocated to each application is a predetermined amount TR and the quality of experience of each application becomes the same. This quality of experience is hereinafter called a uniform quality of experience AQ.

More specifically, the resource amount determination unit 120 determines the amount of resources Ri for each application according to expressions (12) and (13).

$$AQ = f\left(\dfrac{TR - \sum_i a_i}{\sum_i b_i}\right) \quad (12)$$

where
AQ: uniform quality of experience
TR: predetermined amount $$R_i = b_i f^{-1}(AQ) + a_i \quad (13)$$

where
AQ: uniform quality of experience

Note that the predetermined amount TR is set by a designer of the device, for example. Specifically, for example, it is possible to determine the amount of resources that can be used to execute the applications among the amount of resources of the small-sized device.

Figure 4:
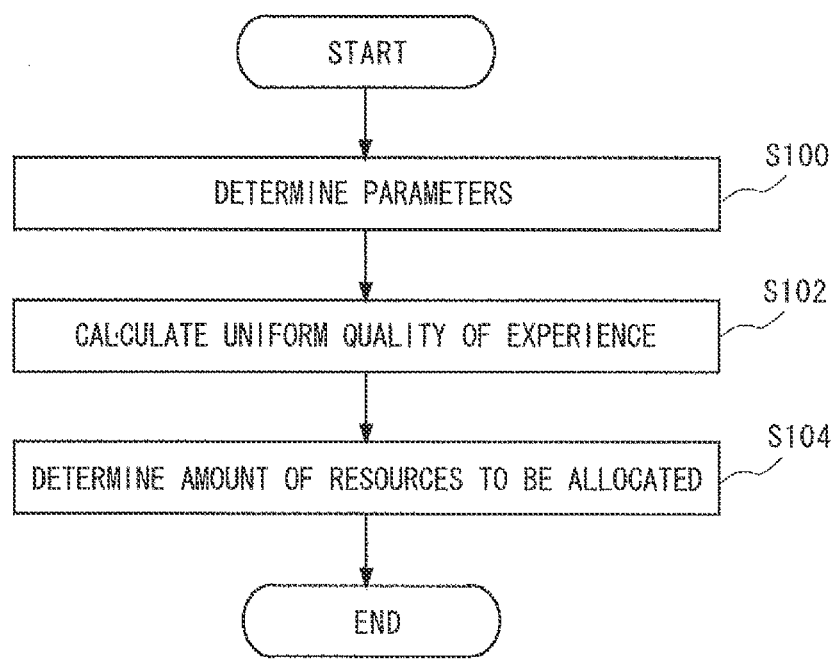
FIG. 4 is a flowchart showing a process flow in the resource allocation apparatus shown in FIG. 1.

FIG. 4 is a flowchart showing a process flow in the resource allocation apparatus 100 shown in FIG. 1.

First, the parameter determination unit 110 substitutes, for each application, the recommended amount of resources $R_i^{high}$ and the quality of experience $Q_i^{high}$ corresponding thereto, and the minimum amount of resources $R_i^{low}$ and the quality of experience $Q_i^{low}$ corresponding thereto into the simultaneous equations shown by expression (5) and expression (6) stated above to calculate the first parameter $a_i$ and the second parameter $b_i$ (S100).

The resource amount determination unit 120 substitutes the first parameter $a_i$ and the second parameter $b_i$ of each application calculated by the parameter determination unit 110 into expression (12), to calculate the uniform quality of experience AQ (S102).

Then, the resource amount determination unit 120 substitutes, for each application, the first parameter $a_i$ and the second parameter $b_i$ of the application and the uniform quality of experience AQ calculated in Step S102 into expression (13), to calculate the amount of resources Ri to be allocated to the application (S104).

Now, the resource allocation apparatus 100 shown in FIG. 1 will be described more detail using the following specific examples.

For example, the resources which are to be allocated is CPU arithmetic capacity of the device, and the amount of resources (predetermined amount TR stated above) that can be allocated to applications is 100%. There are three types of applications that are activated: a decoder compliant with H.264 (hereinafter referred to as an H.264 decoder), an application for facial recognition (hereinafter referred to as a facial recognition AP), and an application for news viewing (hereinafter referred to as a news viewing AP).

The H.264 decoder is an application for decoding a file of H.264 format which is a video codec, and the facial recognition AP is an application for analyzing an input image from a camera included in the device to judge whether the face is displayed. The news viewing AP is an application for acquiring and displaying news at predetermined intervals.

Figure 5:
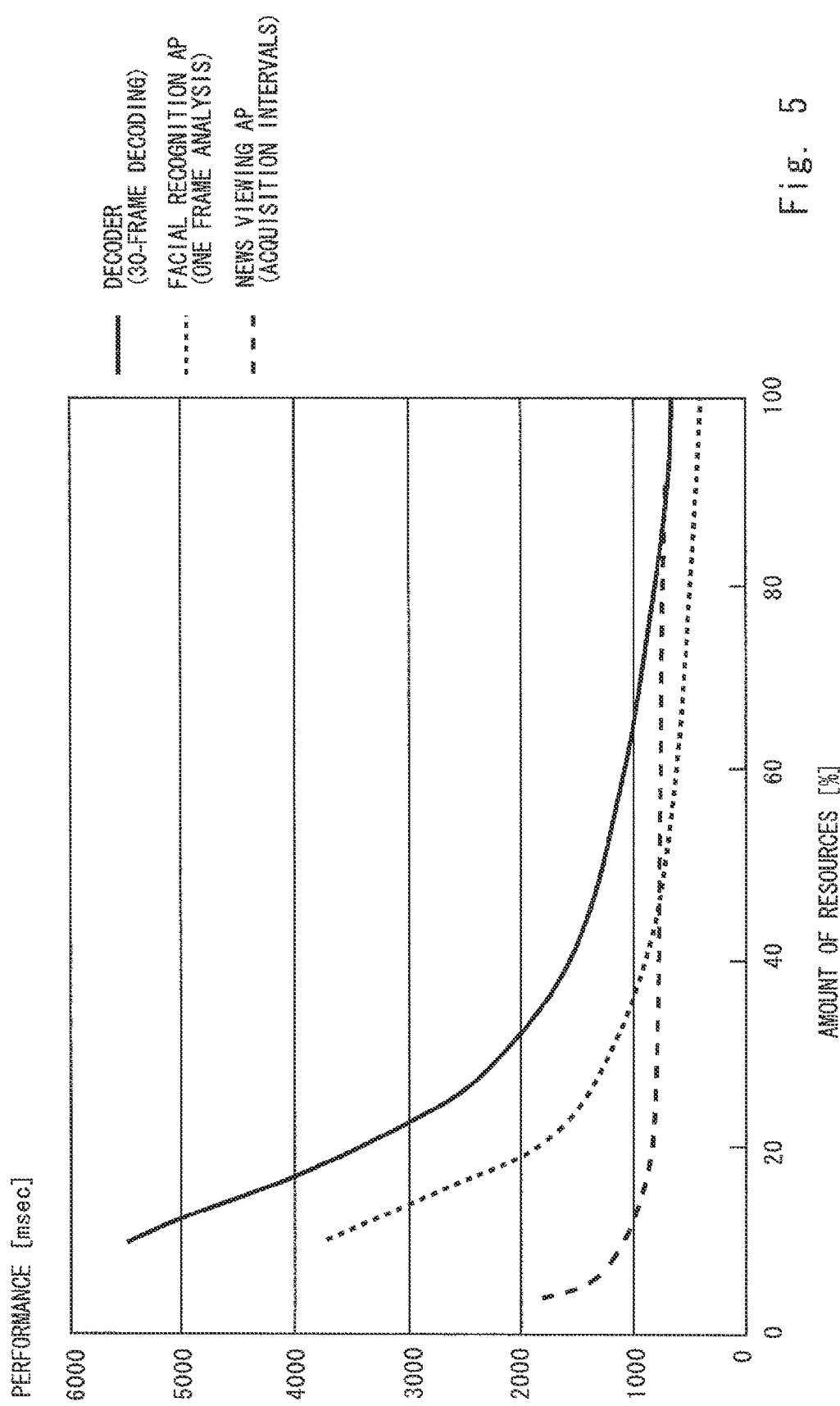
FIG. 5 is a diagram showing an example of a relation between performance of applications and an amount of resources.

Further, it is assumed that the relation between the amount of resources to be used and the performance is obtained as shown in FIG. 5 for the three applications. In the example shown in FIG. 5, the performance of the H.264 decoder is indicated by time required to decode 30 frames, the performance of the facial recognition AP is indicated by time required to analyze one frame, and the performance of the news viewing AP is indicated by intervals to acquire the news.

Further, for each application, it is assumed that the quality of experience $Q_i^{high}$ corresponding to the recommended amount of resources $R_i^{high}$ is 0.8 and the quality of experience $Q_i^{low}$ corresponding to the minimum amount of resources $R_i^{low}$ is 0.2.

The parameter determination unit 110 determines the recommended amount of resources $R_i^{high}$ and the minimum amount of resources $R_i^{low}$ based on the relation between the performance and the application shown in FIG. 5. The determination of the recommended amount of resources $R_i^{high}$ and the minimum amount of resources $R_i^{low}$ is performed based on the standards in which it is sufficient to decode 30 frames in one second for the H.264 decoder, it is desired to analyze one frame in 0.5 to 1 second for the facial recognition AP, it is desired to acquire the news at intervals of one second for the news viewing AP, and the like.

In this way, for example, for the H.264 decoder, $R_i^{high}$ and $R_i^{low}$ are 70% and 60%, respectively, for the facial recognition AP, $R_i^{high}$ and $R_i^{low}$ are 80% and 40%, respectively, and for the news viewing AP, $R_i^{high}$ and $R_i^{low}$ are 30% and 10%, respectively.

The parameter determination unit 110 substitutes, for each application, $Q_i^{high}$ (in this example, 0.8), $R_i^{high}$, $Q_i^{low}$ (in this example, 0.2), and $R_i^{low}$ into expressions (5) and (6) to solve the first parameter $a_i$ and the second parameter $b_i$. In this example, for the H.264 decoder, the first parameter $a_i$ and the second parameter $b_i$ are 65 and 3.6, respectively. For the facial recognition AP, the first parameter $a_i$ and the second parameter $b_i$ are 60 and 14.4, respectively, and for the news viewing AP, the first parameter $a_i$ and the second parameter $b_i$ are 20 and 7.2, respectively.

Figure 6:
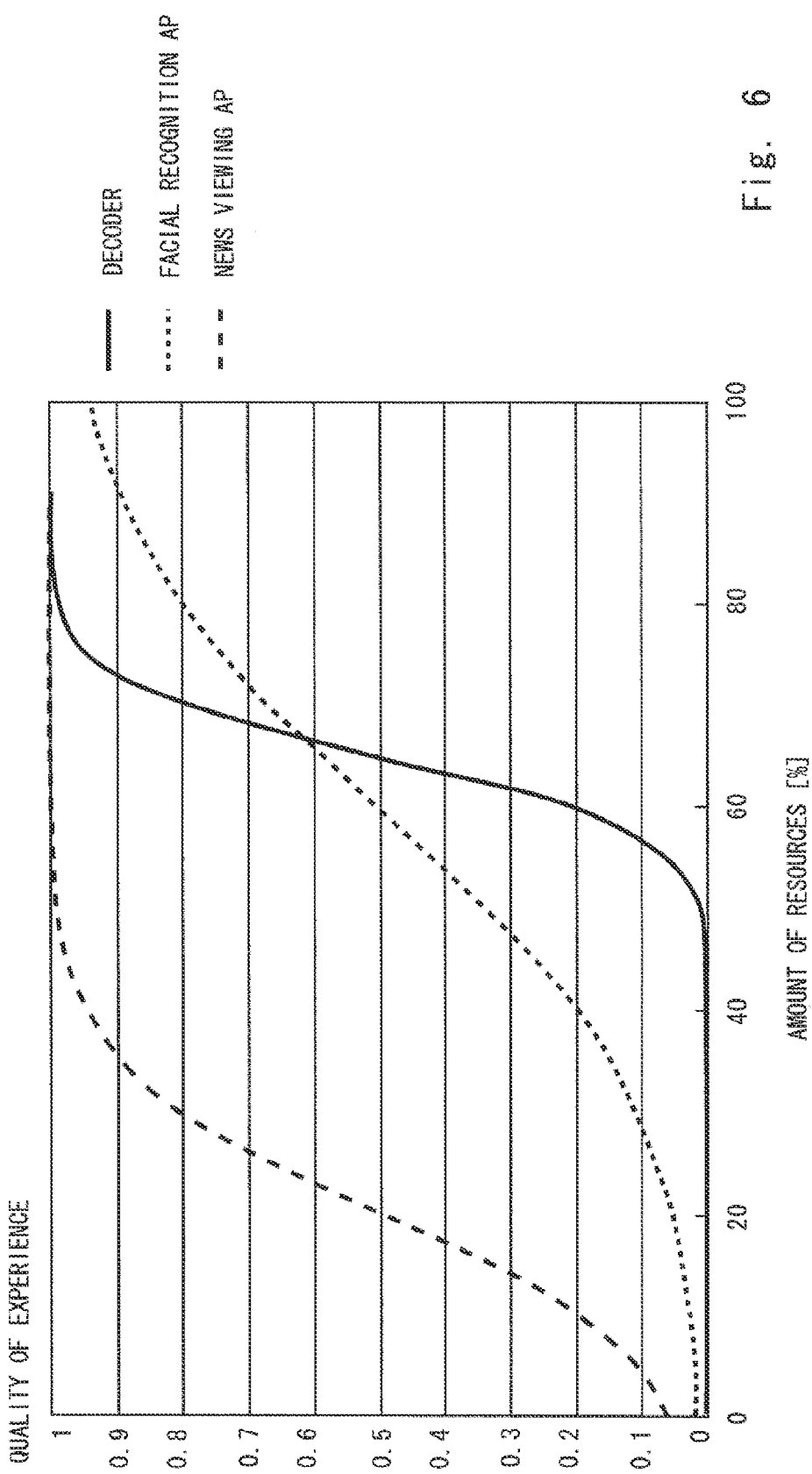
FIG. 6 is a diagram showing a quality function created for three applications shown in FIG. 5.

Accordingly, the quality functions of the H.264 decoder, the facial recognition AP, and the news viewing AP are as shown in FIG. 6.

Then, the resource amount determination unit 120 determines the amount of resources to be allocated to each application using each quality function shown in FIG. 6. More specifically, the uniform quality of experience AQ is calculated first according to expression (12), and then the amount of resources Ri to be allocated to each application is calculated by expression (13). Note that the total amount of resources to be allocated to each application is 100%.

Figure 7:
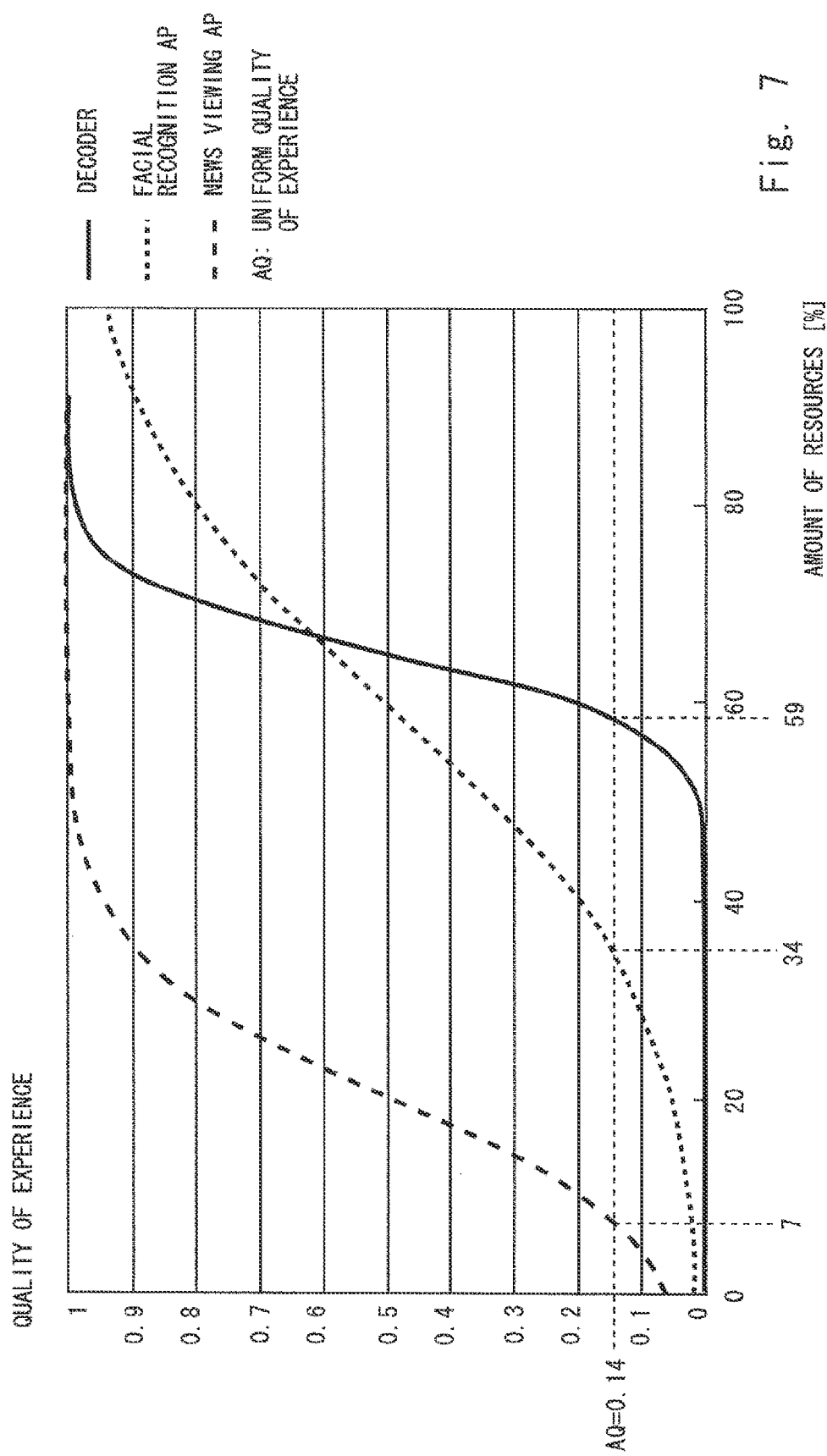
FIG. 7 is a diagram for describing determination of an amount of resources for the three applications shown in FIG. 5.

In this example, as shown in FIG. 7, the uniform quality of experience AQ is 0.14. Further, the amount of resources of 59%, 34%, and 7% are allocated for the H.264 decoder, the facial recognition AP, and the news viewing AP, respectively.

As described above, the resource allocation apparatus 100 according to this exemplary embodiment uses the monotonically increasing function f(x) described above as the quality function when the amount of resources is allocated to the applications. Thus, only the data that is required to be prepared in advance for one application to determine the parameters of the quality function is the recommended amount of resources $R_i^{high}$ and the quality of experience $Q_i^{high}$ corresponding thereto, and the minimum amount of resources $R_i^{low}$ and the quality of experience $Q_i^{low}$ corresponding thereto. Accordingly, the efficiency to create the quality function is improved, and the burden on developers of the applications and designers of the devices can be greatly reduced. While $R_i^{high}$ and $R_i^{low}$ are determined based on the relation between the amount of resources and the performance of the application as shown in FIG. 5 in the description above, $R_i^{high}$ and $R_i^{low}$ itself may be directly supplied to the parameter determination unit 110.

Further, the quality function f(x) has characteristics in which the quality of experience is raised at around the minimum amount of resources, and stops rising at around the recommended amount of resources, thereby being able to achieve resource allocation according to user's intuition.

Further, the determination of the allocation of the amount of resources using the quality function in which the first parameter a and the second parameter b are determined can be analytically performed without searching all the combinations, thereby being able to cut the calculation cost. Therefore, even when the allocation calculation is performed in real time, the calculation overhead required to allocate the amount of resources can be reduced.

Second Exemplary Embodiment

Figure 8:
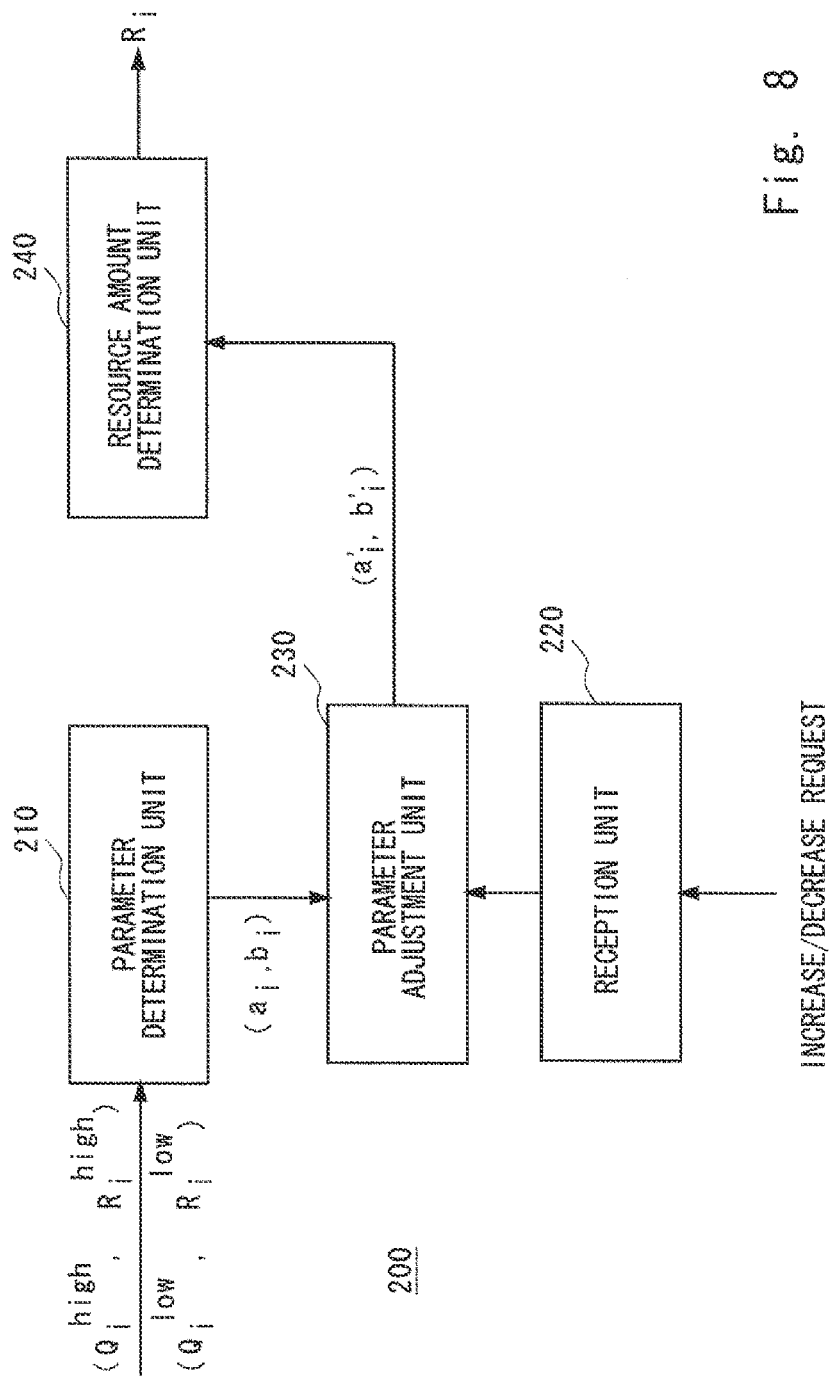
FIG. 8 is a diagram showing a resource allocation apparatus according to a second exemplary embodiment of the present invention.

FIG. 8 shows a resource allocation apparatus 200 according to a second exemplary embodiment of the present invention. The resource allocation apparatus 200 is also installed in a small-sized device such as a mobile telephone, for example, and allocates resources to applications operated on the small-sized device.

The resource allocation apparatus 200 includes a parameter determination unit 210, a reception unit 220, a parameter adjustment unit 230, and a resource amount determination unit 240.

The parameter determination unit 210 performs the similar processing as the parameter determination unit 110 in the resource allocation apparatus 100 shown in FIG. 1. That is, the parameter determination unit 210 calculates, for each of the plurality of applications activated in the small-sized device, the first parameter $a_i$ and the second parameter $b_i$ in the quality function f of expression (2) indicating the relation between the amount of resources to be used and the quality of user experience.

The first parameter $a_i$ and the second parameter $b_i$ of each application calculated by the parameter determination unit 210 are output to the parameter adjustment unit 230 from the parameter determination unit 210.

The reception unit 220 is a user interface that is able to receive an increase/decrease request for each application. This user interface is to input, for each of the applications, the increase/decrease request indicating whether the user desires to increase or decrease the amount of resources and the increase/decrease amount.

The parameter adjustment unit 230 adjusts the first parameter $a_i$ and the second parameter $b_i$ output from the parameter determination unit 210, and outputs the first parameter $a_i$ and the second parameter $b_i$ after adjustment to the resource amount determination unit 240. In order to differentiate the first parameter $a_i$ and the second parameter $b_i$ obtained by the parameter determination unit 210, the first parameter $a_i$ and the second parameter $b_i$ adjusted by the parameter adjustment unit 230 are denoted by the symbols $a_i'$ and $b_i'$.

The parameter adjustment unit 230 determines an adjustment factor $c_i$ according to the increase/decrease request input by the user through the reception unit 220, and performs adjustment as shown in expressions (14) and (15) using the adjustment factor $c_i$ that is determined.

$$a_i' = c_i \times a_i \quad (14)$$

$$b_i' = c_i \times b_i \quad (15)$$

The default value of the adjustment factor $c_i$ is 1 for all the applications. When the increase/decrease request is not input by the user, the parameter adjustment unit 230 uses the default value of the adjustment factor $c_i$.

In summary, when the increase/decrease request is not input by the user, $a_i'$ and $a_i$ are equal to each other, and $b_i'$ and $b_i$ are equal to each other.

When the increase/decrease request is the increase request of the amount of resources, the parameter adjustment unit 230 multiplies the adjustment factor $c_i$ by the first parameter $a_i$ and the second parameter $b_i$. In this case, the adjustment factor $c_i$ is larger than 1, and becomes larger as the amount that is desired to increase is larger. On the other hand, when the increase/decrease request is the decrease request of the amount of resources, the parameter adjustment unit 230 multiplies the adjustment factor $c_i$ by the first parameter $a_i$ and the second parameter $b_i$. In this case, the adjustment factor $c_i$ is smaller than 1, and becomes smaller as the amount that is desired to decrease is smaller.

Figure 9:
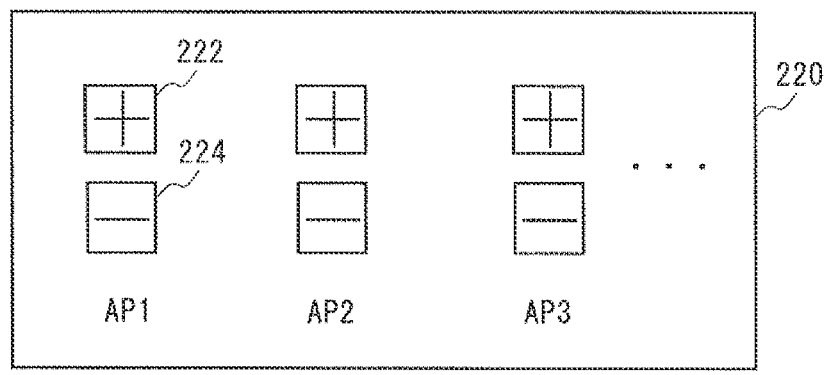
FIG. 9 is a diagram showing an example of a reception unit in the resource allocation apparatus shown in FIG. 8 (case 1)

FIG. 9 shows one example of the reception unit 220 to receive increase/decrease requests. As shown in FIG. 9, the reception unit 220 includes two adjustment buttons (adjustment button 222 and adjustment button 224) for each of the applications (AP1, AP2, AP3, . . . ).

The adjustment button 222 is pressed when it is desired to increase the amount of resources, and the number of times that the button is pressed is in direct proportion to the amount that is desired to increase. Hereinafter, the adjustment button 222 is referred to as an increase button.

The adjustment button 224 is pressed when it is desired to decrease the amount of resources, and the number of times that the button is pressed is in direct proportion to the amount that is desired to decrease. Hereinafter, the adjustment button 224 is referred to as a decrease button.

The parameter adjustment unit 230 determines, as shown in expression (16) and expression (17), for example, the adjustment factor $c_i$ according to the number of times $m_i$ that the increase button 222 is pressed and the number of times $n_i$ that the decrease button 224 is pressed.

$$c_i = 1 + 0.1 \times m_i \quad (16)$$

where
$m_i$: the number of times that the increase button 222 is pressed $$c_i = 1 - 0.1 \times n_i \quad (17)$$

where
$n_i$: the number of times that the decrease button 224 is pressed

Figure 10:
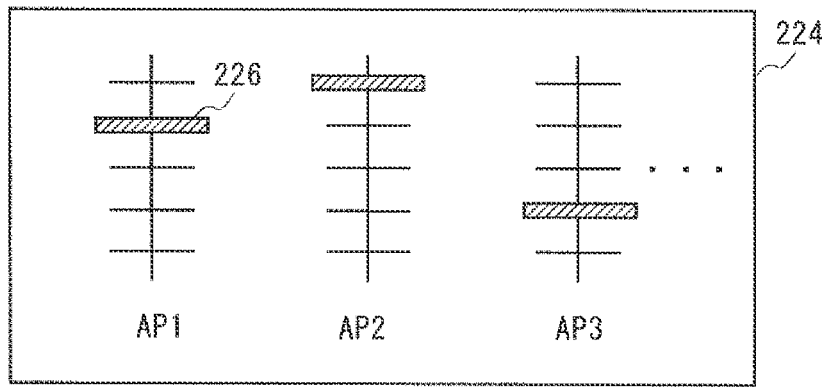
FIG. 10 is a diagram showing an example of the reception unit in the resource allocation apparatus shown in FIG. 8 (case 2)

FIG. 10 shows another example of the reception unit 220. As shown in FIG. 10, an adjustment bar 226 is provided for each of the applications (AP1, AP2, AP3, . . . ).

When the adjustment bar 226 is moved upward from the default position, the parameter adjustment unit 230 adds the value according to the moved distance to 1 to obtain the adjustment factor Meanwhile, when the adjustment bar 226 is moved downward from the default position, the parameter adjustment unit 230 subtracts the value according to the moved distance from 1 to obtain the adjustment factor The parameter adjustment unit 230 outputs, for each application, the first parameter $a_i'$ and the second parameter obtained by multiplying the first parameter $a_i$ and the second parameter $b_i$ by the adjustment factor $c_i$ to the resource amount determination unit 240. For the application that does not receive the increase/decrease requests, $a_i'$ and $a_i$ are equal to each other, and $b_i'$ and $b_i$ are equal to each other.

The resource amount determination unit 240 uses the first parameter after adjustment and the second parameter after adjustment as the first parameter and the second parameter to determines the amount of resources to be allocated to each application by the similar operation as the resource amount determination unit 120.

In summary, according to this exemplary embodiment, the quality function is as shown in expression (18).

$$\begin{aligned} Q_i &= f(x) \\ &= f((R_i - a_i')/b_i') \\ &= f((R_i - c_i \times a_i)/c_i \times b_i) \end{aligned} \quad (18)$$

where
i: number of application
$Q_i$: quality of experience
f: quality function
$R_i$: amount of resources
$a_i$: first parameter before adjustment
$b_i$: second parameter before adjustment
$a_i'$: first parameter after adjustment
$b_i'$: second parameter after adjustment
e that expression (18) is equal to the following expression (19).

$$Q_i = f(x) = f((R_i/c_i - a_i)/b_i) \quad (19)$$

As will be clear from expression (19), the quality function obtained when the values of the first parameter $a_i$ and the second parameter $b_i$ are adjusted is equal to the quality function obtained by multiplying the original recommended amount of resources $R_i^{high}$ and the minimum amount of resources $R_i^{low}$ by and $c_i$ indicates a parameter multiplying the recommended amount of resources $R_i^{high}$ and the minimum amount of resources $R_i^{low}$ by $c_i$. In short, it can be said that the symbol $c_i$ is a parameter that is set when the original amount of allocation of the amount of resources is desired to be changed according to the ratio when the application is more important or not important for the user under a certain situation.

Figure 11:
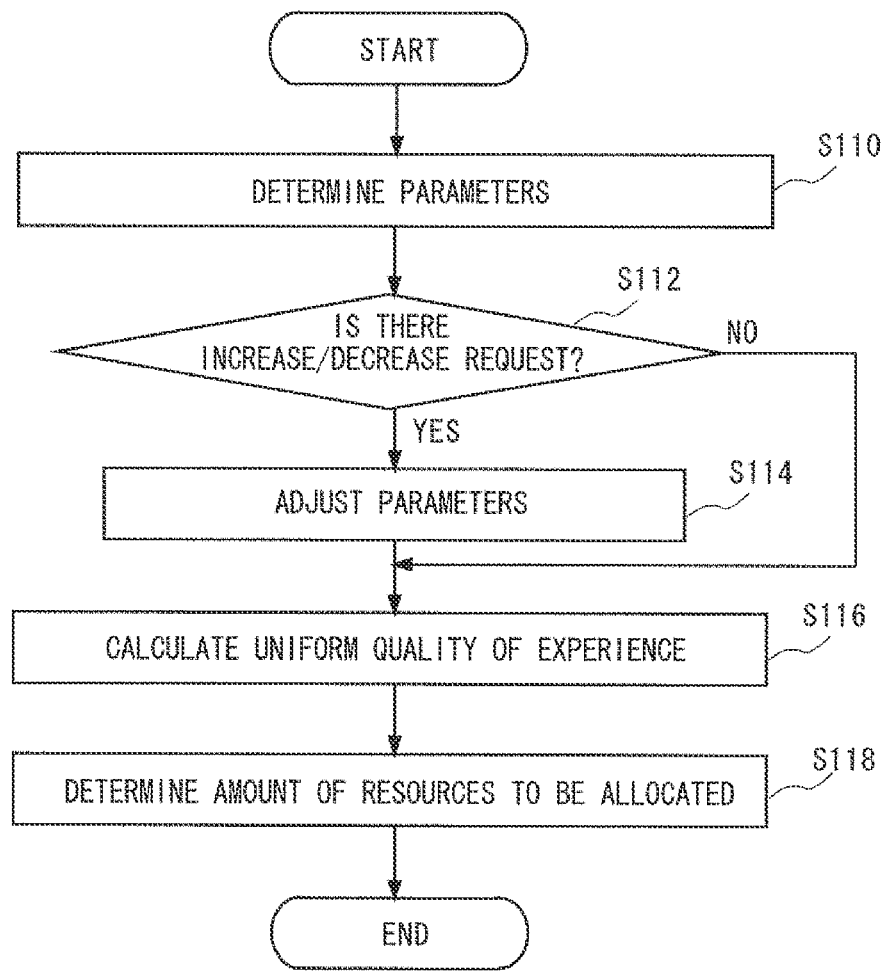
FIG. 11 is a flowchart showing a process flow in the resource allocation apparatus shown in FIG. 8.

FIG. 11 is a flowchart showing a process flow in the resource allocation apparatus 200. First, the parameter determination unit 210 substitutes, for each application, the recommended amount of resources $R_i^{high}$ and the quality of experience $Q_i^{high}$ corresponding thereto and the minimum amount of resources $R_i^{low}$ and the quality of experience $Q_i^{low}$ corresponding thereto into the simultaneous equations shown by expressions (5) and (6) stated above, to calculate the first parameter $a_i$ and the second parameter $b_i$ (S110). The first parameter $a_i$ and the second parameter $b_i$ are input to the parameter adjustment unit 230.

For the application in which it is not required to increase or decrease the amount of resources through the reception unit 220 (S112: No), the parameter adjustment unit 230 outputs the first parameter $a_i$ and the second parameter $b_i$ to the resource amount determination unit 240 without any adjustment.

On the other hand, for the application in which it is required to increase or decrease the amount of resources through the reception unit 220 (S112: Yes), the parameter adjustment unit 230 outputs values obtained by multiplying the first parameter $a_i$ and the second parameter $b_i$ of the application by the adjustment factor according to the increase/decrease request to the resource amount determination unit 240 (S114).

The resource amount determination unit 240 calculates the uniform quality of experience AQ using the first parameter and the second parameter after adjustment output from the parameter adjustment unit 230, and calculates, for each application, the amount of resources corresponding to the uniform quality of experience AQ as the amount of resources Ri to be allocated to the application (S116, S118).

For example, in the case of three applications shown in FIG. 5 (H.264 decoder, facial recognition AP, news viewing AP), it is assumed that the increase/decrease request in which $c_i$ is 0.5 is input to the H.264 decoder, and the increase/decrease request is not input to the other two applications.

Figure 12:
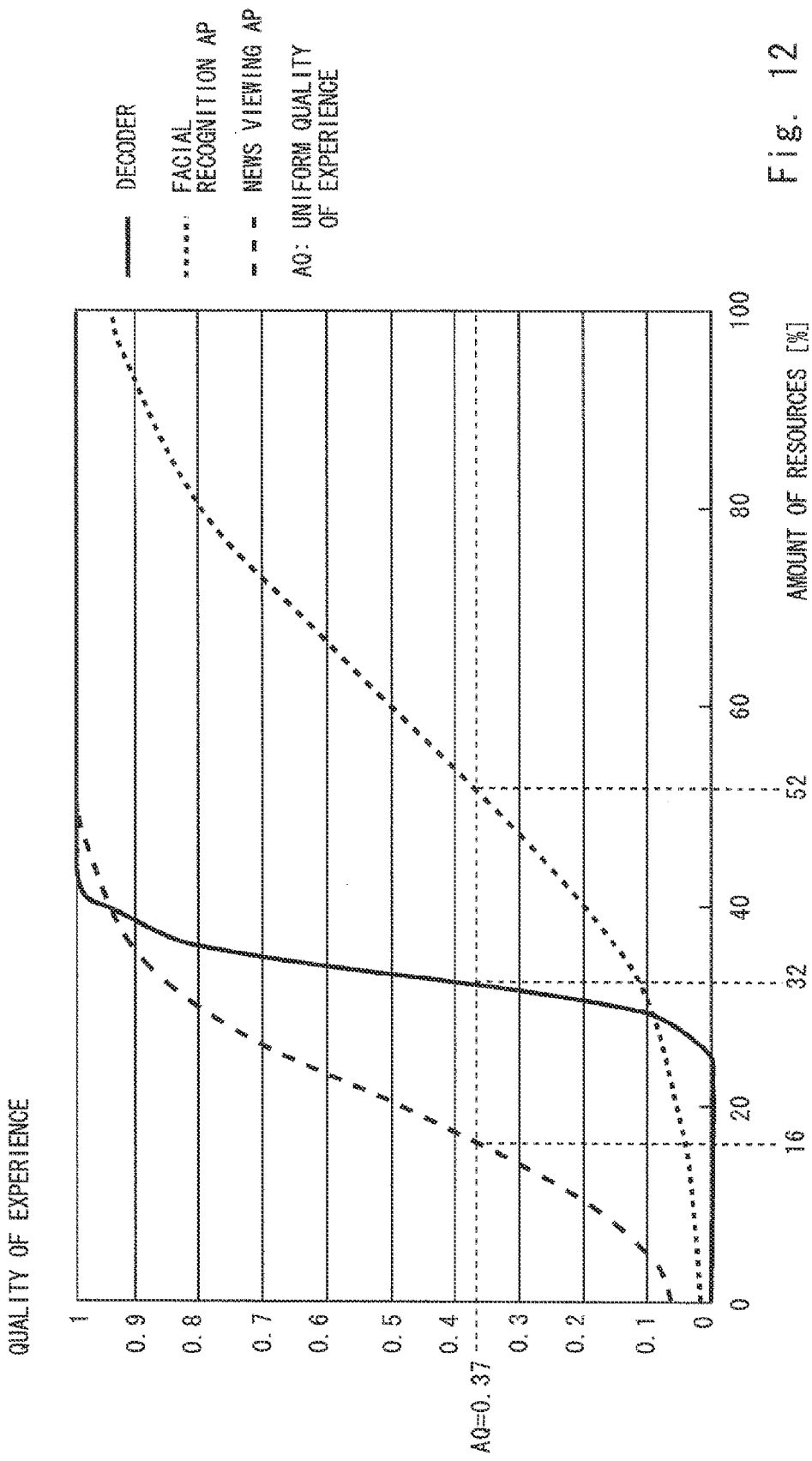
FIG. 12 is a diagram for describing an example of allocation of an amount of resources by the resource allocation apparatus shown in FIG. 8.

In this case, the quality function corresponding to the three applications is as shown in FIG. 12. Further, the uniform quality of experience AQ is 0.37, and the amount of resources allocated to the H.264 decoder, the facial recognition AP, and the news viewing AP are 32%, 52%, and 16%, respectively.

This case corresponds to the case in which the decoder is not important in a certain situation and it is sufficient that the decoder is able to perform decoding at 15 frame/sec, which is half the normal decoder. According to the resource allocation apparatus 200, the amount of resources to be allocated to the H.264 decoder in this case is decreased from 59% in the resource allocation apparatus 100 to 32%, which means it is possible to allocate the reduced resources to other applications.

In short, according to the resource allocation apparatus 200 of the second exemplary embodiment, it is possible to obtain the similar effect as in the resource allocation apparatus 100 according to the first exemplary embodiment, and to reflect the user's intention on the allocation of the amount of resources.

Third Exemplary Embodiment

Figure 13:
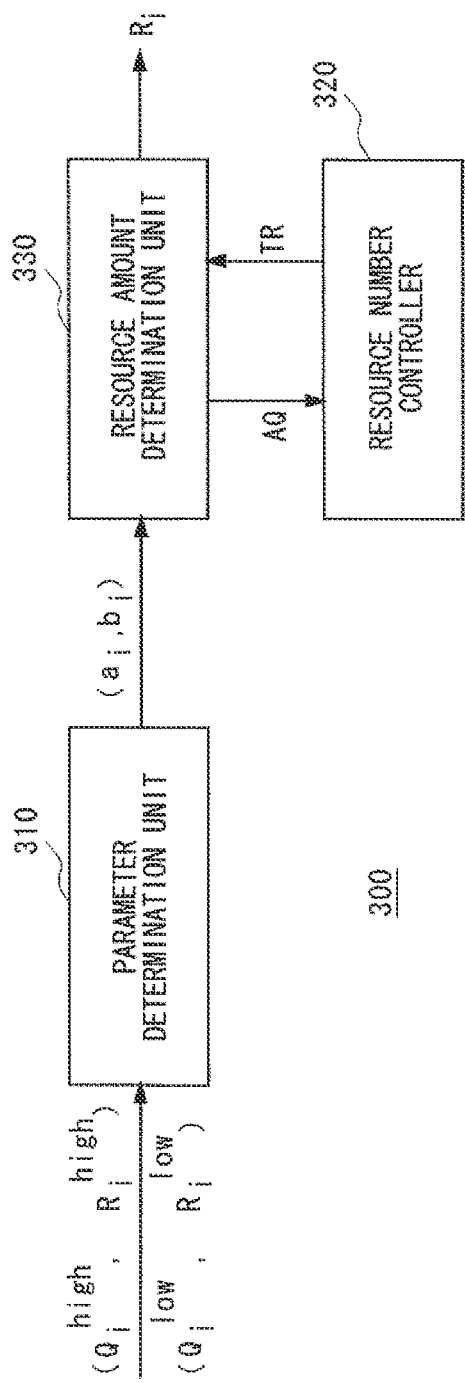
FIG. 13 is a diagram showing a resource allocation apparatus according to a third exemplary embodiment of the present invention.

FIG. 13 shows a resource allocation apparatus 300 according to a third exemplary embodiment of the present invention. This resource allocation apparatus 300 includes a parameter determination unit 310, a resource number controller 320, and a resource amount determination unit 330.

The resource allocation apparatus 300 according to the third exemplary embodiment is able to control the number of resources to be allocated to the applications when there are the same type of a plurality of resources. For example, the number of resources of "CPU arithmetic capacity" that exist in a device in which a plurality of CPU cores are installed corresponds to the number of CPU cores.

The parameter determination unit 310 performs the similar operation as the parameter determination unit 110 in the resource allocation apparatus 100, and calculates the first parameter $a_i$ and the second parameter $b_i$ for each application, to output the result to the resource amount determination unit 330.

The resource amount determination unit 330 calculates the uniform quality of experience AQ using the first parameter $a_i$ and the second parameter $b_i$ from the parameter determination unit 310, to output the result to the resource number controller 320. The method of calculating the uniform quality of experience AQ is similar to the method of the resource amount determination unit 120 in the resource allocation apparatus 100. However, it should be noted that the predetermined amount TR which is the total amount of resources to be allocated to the applications used in this calculation is supplied from the resource number controller 320.

The resource number controller 320 performs control so that the number of resources to be allocated to the applications becomes the minimum number under a condition that the uniform quality of experience AQ is equal to or larger than a predetermined threshold when there are the same type of a plurality of resources. For the sake of clarity, description will be made taking as an example a case in which three applications shown in FIG. 5 (H.264 decoder, facial recognition AP, news viewing AP) are installed. Further, it is assumed that the threshold of the uniform quality of experience AQ is set to 0.5.

The resource number controller 320 first supplies the arithmetic capacity (100%) of one CPU core as a predetermined amount TR to the resource amount determination unit 330.

Figure 14:
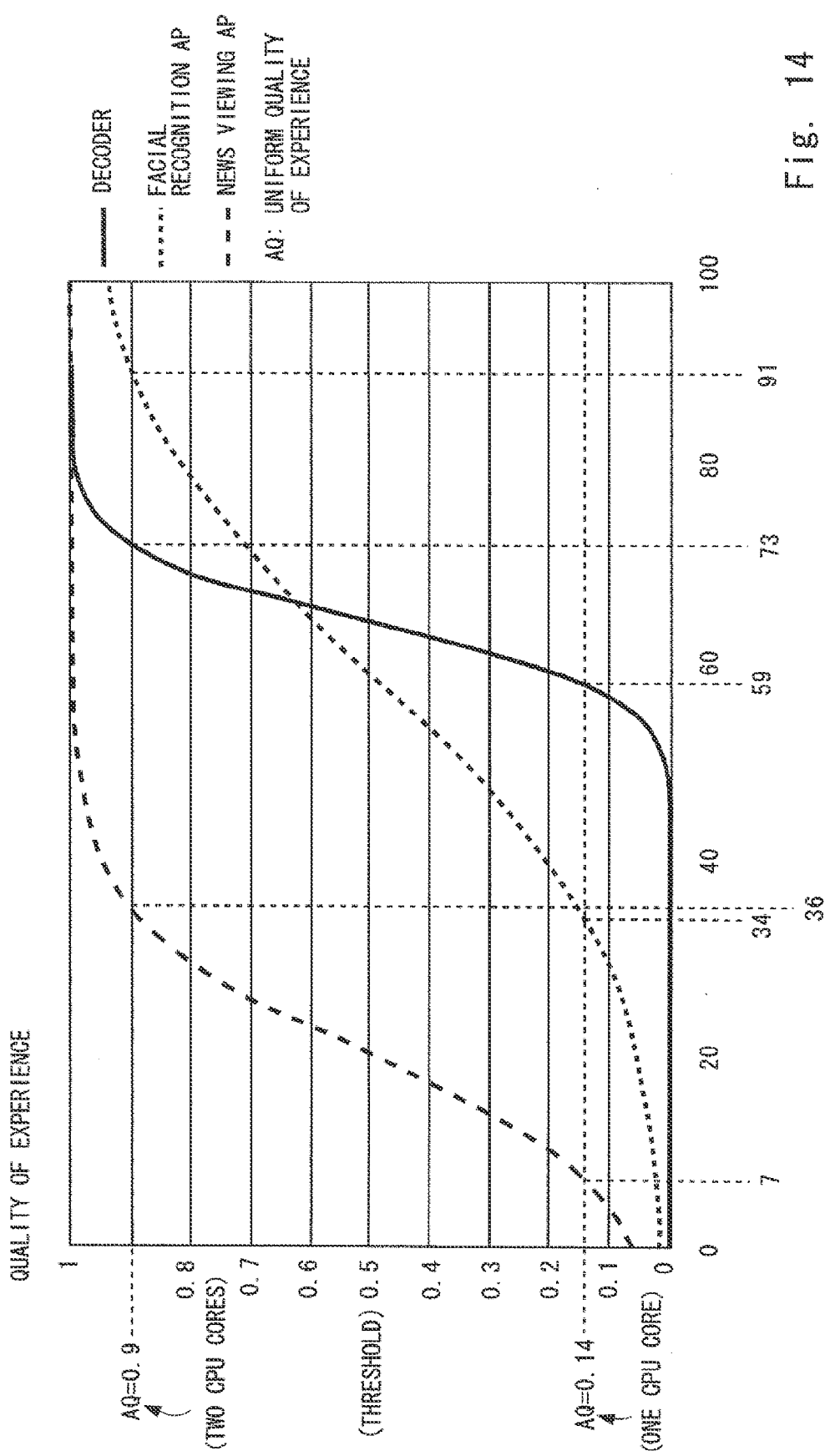
FIG. 14 is a diagram for describing an example of allocation of an amount of resources by the resource allocation apparatus shown in FIG. 13.

As shown in FIG. 14, when the predetermined amount TR is 100%, the uniform quality of experience AQ calculated by the resource amount determination unit 330 is 0.14, as is similar to the case of the resource allocation apparatus 100 according to the first exemplary embodiment. In accordance therewith, the amount of resources Ri to be allocated to the H.264 decoder, the facial recognition AP, and the news viewing AP are 59%, 34%, and 7%, respectively, as is similar to the resource allocation apparatus 100 according to the first exemplary embodiment.

The resource number controller 320 compares the uniform quality of experience AQ calculated by the resource amount determination unit 330 with the threshold (in this example, 0.5). Since the current uniform quality of experience AQ is 0.14, which is smaller than the threshold, the resource number controller 320 changes the predetermined amount TR to the value (e.g., 200%) corresponding to the case in which two CPU cores are provided, to output the result to the resource amount determination unit 330, to cause the resource amount determination unit 330 to perform re-calculation of the uniform quality of experience AQ.

The resource amount determination unit 330 re-calculates the uniform quality of experience AQ using the predetermined amount TR that is changed, to output the calculation result to the resource number controller 320. The uniform quality of experience AQ at this time is, as shown in FIG. 14, 0.9.

Since the uniform quality of experience AQ exceeds the threshold 0.5, the resource number controller 320 determines the number of CPU cores to two, to cause the resource amount determination unit 330 to perform determination of allocation of the amount of resources. As shown in FIG. 14, the amount of resources Ri to be allocated to the H.264 decoder, the facial recognition AP, and the news viewing AP is 73%, 91%, and 36%, respectively, corresponding to the uniform quality of experience AQ which is 0.9.

Incidentally, the allocation according to the amount of resources Ri that is calculated above may not be achieved in reality. For example, when the applications are not parallelized and thus cannot be executed by a plurality of CPUs, it is impossible to allocate the amount of resources of 200% with the allocation rate of 73%, 91%, and 36%.

In this exemplary embodiment, the resource amount determination unit 330 includes a function of adjusting the amount of resources that is determined so that they can further be allocated. For example, for each application, the amount of resources is adjusted under the assumption that the quality of experience is equal to or larger than the threshold. In the example above, for example, the amount of resources is changed to 100% for the facial recognition AP having the largest amount of resources that is determined, and the rest of 100% is re-allocated for the H.264 decoder and the news viewing AP. Therefore, after adjustment, the amount of resources of the H.264 decoder, the facial recognition AP, and the news viewing AP is 70%, 100%, and 30%, respectively.

Figure 15:
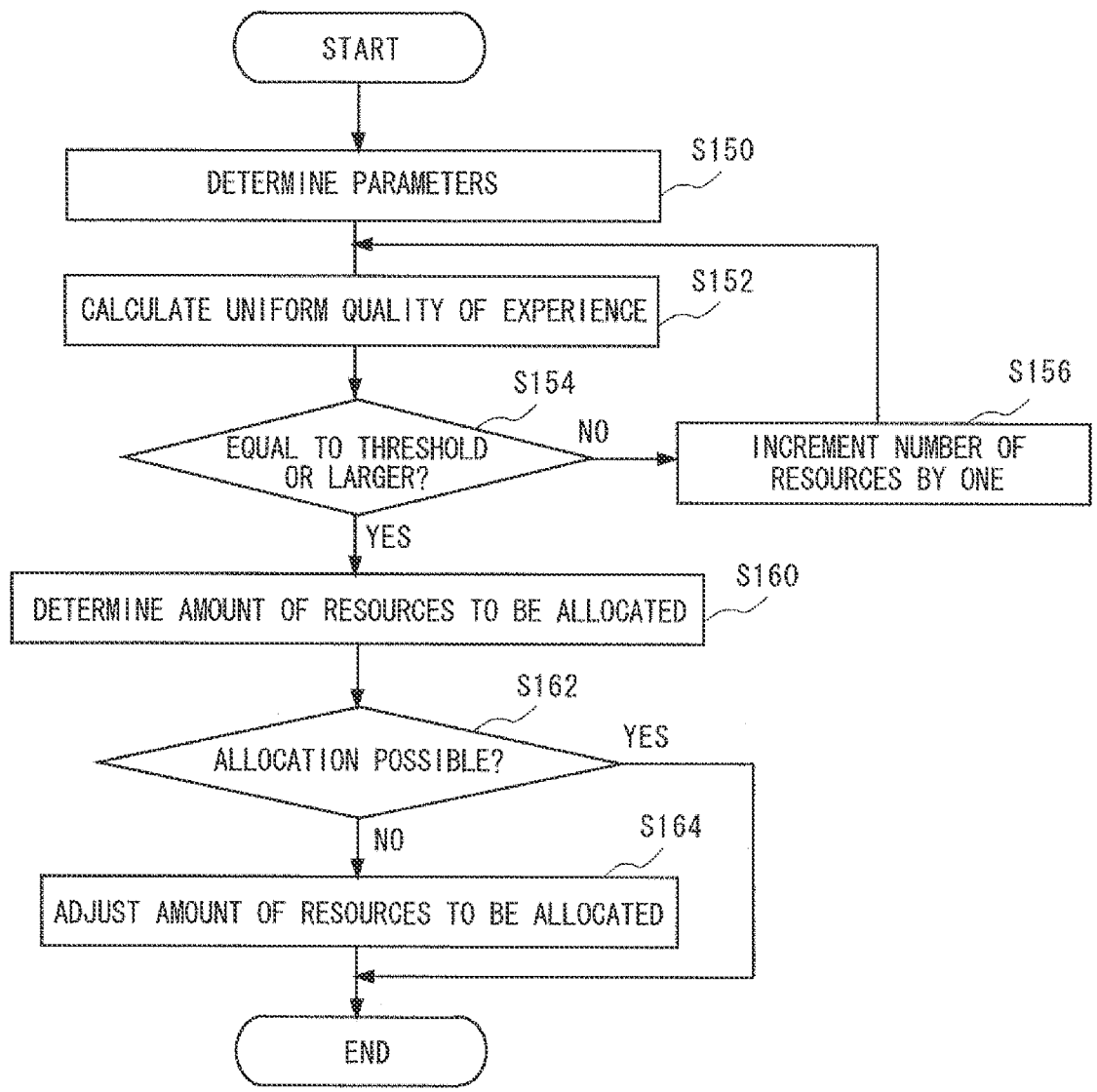
FIG. 15 is a flowchart showing a process flow in the resource allocation apparatus shown in FIG. 13.

FIG. 15 is a flowchart showing a process flow in the resource allocation apparatus 300. First, the parameter determination unit 310 substitutes, for each application, the recommended amount of resources $R_i^{high}$ and the quality of experience $Q_i^{high}$ corresponding thereto, and the minimum amount of resources $R_i^{low}$ and the quality of experience $Q_i^{lowQL}$ corresponding thereto into the simultaneous equations shown in expression (5) and expression (6) stated above, to calculate the first parameter $a_i$ and the second parameter $b_i$ (S150). These first parameter $a_i$ and second parameter $b_i$ are output to the resource amount determination unit 330.

The resource amount determination unit 330 calculates the uniform quality of experience AQ so that the total amount of resources to be allocated to each application becomes the predetermined amount TR in the case in which one CPU core is used, to output the result to the resource number controller 320 (S152).

When the uniform quality of experience AQ output from the resource amount determination unit 330 is smaller than a predetermined threshold (S154: No), the resource number controller 320 increments the number of resources by one, to output the corresponding predetermined amount TR to the resource amount determination unit 330 (S156).

The resource amount determination unit 330 re-calculates the uniform quality of experience AQ using the predetermined amount TR that is reset by the resource number controller 320 (S152-).

The processing from Step S152 is repeated until when the uniform quality of experience AQ reaches the threshold or more (S154: No, S156, S152-).

When the uniform quality of experience AQ from the resource amount determination unit 330 is equal to or larger than the threshold (S154: Yes), the resource number controller 320 determines the current number of resources as the number of resources to be used, and the resource amount determination unit 330 determines the amount of resources of each application corresponding to the current uniform quality of experience AQ (S160).

Then, when it is possible to perform allocation according to the amount of resources that is determined (S162: Yes), the resource amount determination unit 330 performs allocation according to the amount of resources that is determined. On the other hand, when it is impossible to perform allocation according to the amount of resources that is determined (S162: No), the resource amount determination unit 330 adjusts the amount of resources that is determined so they can be allocated (S164).

According to the resource allocation apparatus 300 according to this exemplary embodiment, it is possible to obtain the effects of the resource allocation apparatus 100. Further, when there are the same type of a plurality of resources, the number of resources is minimized under a condition that the uniform quality of experience AQ is equal to or larger than the threshold, thereby being able to suppress excessive consumption of resources and to reduce power consumption.

The present invention has been described with reference to the exemplary embodiments. However, the exemplary embodiments are merely examples, and various changes, modifications, and combinations may be added to each exemplary embodiment stated above without departing from the spirit of the present invention. A person skilled in the art would understand that the variant examples in which the changes, modifications, and combinations are made are also within the scope of the present invention.

This application claims the benefit of priority, and incorporates herein by reference in its entirety, the following Japanese Patent Application No. 2010-054283 filed on Mar. 11, 2010.

INDUSTRIAL APPLICABILITY

The present invention is applicable to allocation of resources to a plurality of applications operated on a computer.

REFERENCE SIGNS LIST

100 RESOURCE ALLOCATION APPARATUS
110 PARAMETER DETERMINATION UNIT
120 RESOURCE AMOUNT DETERMINATION UNIT
200 RESOURCE ALLOCATION APPARATUS
210 PARAMETER DETERMINATION UNIT
220 RECEPTION UNIT
222 INCREASE BUTTON
224 DECREASE BUTTON
230 PARAMETER ADJUSTMENT UNIT
226 ADJUSTMENT BAR
240 RESOURCE AMOUNT DETERMINATION UNIT
300 RESOURCE ALLOCATION APPARATUS
310 PARAMETER DETERMINATION UNIT
320 RESOURCE NUMBER CONTROLLER
330 RESOURCE AMOUNT DETERMINATION UNIT
AQ UNIFORM QUALITY OF EXPERIENCE
A FIRST PARAMETER
B SECOND PARAMETER
TR PREDETERMINED AMOUNT

The invention claimed is:

1. A resource allocation apparatus for performing allocation of an amount of resources to a plurality of applications operated on a computer, the resource allocation apparatus comprising:
   parameter determination means for determining, for each of the plurality of applications, a first parameter a and a second parameter b in a quality function f of expression (1) indicating a relation between an amount of resources to be used and a quality of user experience;
   resource amount determination means for determining an amount of resources to be allocated to the plurality of applications using the quality function f for each of the plurality of applications in which the first parameter a and the second parameter b are determined by the parameter determination means,
reception means for receiving an increase/decrease request of an amount of resources for any one of the plurality of applications; and
parameter adjustment means for multiplying, for the any one of the applications, the first parameter a and the second parameter b determined by the parameter determination means by a multiple number larger than one, the number increasing according to an increase amount indicated by the increase/decrease request received by the reception means, the parameter adjustment means multiplying the first parameter a and the second parameter b by a multiple number smaller than one, the number decreasing according to a decrease amount indicated by the increase/decrease request received by the reception means,
wherein:
the parameter determination means substitutes, for each of the applications, a recommended amount of resources and a quality of experience corresponding to the recommended amount of resources, and a minimum amount of resources and a quality of experience corresponding to the minimum amount of resources into expression (1), to calculate the first parameter a and the second parameter b in expression (1),
the quality function f(x) is a monotonically increasing function having an inverse function $f^{-1}$, connects $(-\infty, 0)$ and $(+\infty, 1)$, and is symmetrical with respect to x=0:

$$Q=f(x)=f((R-a)/b) \qquad (1),$$

where:
Q: quality of experience;
f: quality function;
R: amount of resources;
a: first parameter; and
b: second parameter; and
the resource amount determination means determines, for the any one of the applications, the amount of resources to be allocated to the application using the quality function f in which the first parameter a and the second parameter b are adjusted by the parameter adjustment means.

2. The resource allocation apparatus according to claim 1, wherein the resource amount determination means determines the amount of resources to be allocated to the plurality of applications so that a total amount of resources to be allocated to the plurality of applications is a predetermined amount, and the quality of experience of each of the applications is a uniform quality of experience of the same value.

3. The resource allocation apparatus according to claim 1, wherein the resource amount determination means determines the amount of resources to be allocated to the plurality of applications so that a total amount of resources to be allocated to the plurality of applications is a predetermined amount, and the quality of experience of each of the applications is a uniform quality of experience of the same value.

4. The resource allocation apparatus according to claim 2, further comprising resource number control means for performing control, when there are a same type of a plurality of resources, so that the number of resources to be allocated to the plurality of applications becomes a minimum number under a condition that the uniform quality of experience is equal to or larger than a predetermined certain threshold.

5. The resource allocation apparatus according to claim 3, further comprising resource number control means for performing control, when there are a same type of a plurality of resources, so that the number of resources to be allocated to the plurality of applications becomes a minimum number under a condition that the uniform quality of experience is equal to or larger than a predetermined certain threshold.

6. The resource allocation apparatus according to claim 1, wherein the quality function f(x) is one of expression (2) and expression (3):

$$f(x)=1/(1+e^{\hat{}}(-x)) \qquad (2)$$

$$f(x)=(1/\pi)\times\arctan(x)+\tfrac{1}{2} \qquad (3).$$

7. A resource allocation method for performing allocation of an amount of resources to a plurality of applications operated on a computer, the resource allocation method comprising:
for each of the plurality of applications, substituting a recommended amount of resources and a quality of experience corresponding to the recommended amount of resources, and a minimum amount of resources and a quality of experience corresponding to the minimum amount of resources into a quality function f of expression (4) indicating a relation between an amount of resources to be used R and a quality of user experience Q, to determine a first parameter a and a second parameter b;
determining an amount of resources to be allocated to the plurality of applications using the quality function f for each of the plurality of applications in which the first parameter a and the second parameter b are determined,
receiving an increase/decrease request of an amount of resources for any one of the plurality of applications; and
multiplying, for the any one of the applications, the first parameter a and the second parameter b by a multiple number larger than one, the number increasing according to an increase amount indicated by the increase/decrease request, and multiplying the first parameter a and the second parameter b by a multiple number smaller than one, the number decreasing according to a decrease amount indicated by the increase/decrease request,
wherein the quality function f(x) is a monotonically increasing function having an inverse function $f^{-1}$, connects $(-\infty, 0)$ and $(+\infty, 1)$, and is symmetrical with respect to x=0:

$$Q=f(x)=f((R-a)/b) \qquad (4),$$

where:
Q: quality of experience;
f: quality function;
R: amount of resources;
a: first parameter; and
b: second parameter; and
wherein it is determined, for the any one of the applications, the amount of resources to be allocated to the application using the quality function f in which the first parameter a and the second parameter b are adjusted.

8. A non-transitory computer readable medium storing a program for causing a computer to execute, when performing allocation of an amount of resources to a plurality of applications operated on a computer, the following processing of:
for each of the plurality of applications, substituting a recommended amount of resources and a quality of experience corresponding to the recommended amount of resources, and a minimum amount of resources and a quality of experience corresponding to the minimum amount of resources into a quality function f of expression (5) indicating a relation between an amount of resources to be used R and a quality of user experience Q, to determine a first parameter a and a second parameter b;

determining an amount of resources to be allocated to the plurality of applications using the quality function f for each of the plurality of applications in which the first parameter a and the second parameter b are determined, receiving an increase/decrease request of an amount of resources for any one of the plurality of applications; and multiplying, for the any one of the applications, the first parameter a and the second parameter b by a multiple number larger than one, the number increasing according to an increase amount indicated by the increase/decrease request, and multiplying the first parameter a and the second parameter b by a multiple number smaller than one, the number decreasing according to a decrease amount indicated by the increase/decrease request, wherein the quality function f(x) is a monotonically increasing function having an inverse function $f^{-1}$, connects $(-\infty, 0)$ and $(+\infty, 1)$, and is symmetrical with respect to x=0:

$$Q=f(x)=f((R-a)/b) \qquad (5),$$

where:
- Q: quality of experience;
- f: quality function;
- R: amount of resources;
- a: first parameter; and
- b: second parameter; and wherein it is determined, for the any one of the applications, the amount of resources to be allocated to the application using the quality function f in which the first parameter a and the second parameter b are adjusted.

* * * * *

UNITED STATES PATENT AND TRADEMARK OFFICE
CERTIFICATE OF CORRECTION

PATENT NO. : 8,938,740 B2
APPLICATION NO. : 13/581775
DATED : January 20, 2015
INVENTOR(S) : Kosuke Nishihara and Kazuhisa Ishizaka It is certified that error appears in the above-identified patent and that said Letters Patent is hereby corrected as shown below:

In the Specification

Column 6, Line 16: Delete "$f^{-1}$," and insert -- $f^1$, --

Column 10, Line 15: After "factor" insert -- $c_i$. --

Column 10, Line 18: After "factor" insert -- $c_i$. --

Column 10, Line 20: After "parameter" insert -- $b_i'$ -- (Second Occurrence)

Column 10, Line 60: After "by" insert -- $c_i$, --

Signed and Sealed this
Sixteenth Day of February, 2016

Michelle K. Lee
*Director of the United States Patent and Trademark Office*